United States Patent [19]

Auchapt et al.

[11] Patent Number: 4,588,524
[45] Date of Patent: May 13, 1986

[54] MACHINE FOR COMPACTING FUEL ASSEMBLIES

[75] Inventors: Pierre Auchapt; Robert Sablier; José Symard; Philippe Seyfried, all of Bagnols Sur Ceze, France

[73] Assignee: Commissariat a l'Energie Atomique, Paris, France

[21] Appl. No.: 494,927

[22] Filed: May 16, 1983

[30] Foreign Application Priority Data

May 18, 1982 [FR] France ................. 82 08700

[51] Int. Cl.$^4$ .............................................. G21F 9/34
[52] U.S. Cl. ...................................... 252/626; 83/923; 100/98 R; 252/627; 376/311
[58] Field of Search ............. 252/626, 633, 627; 100/229 R, 229 A, 226, 39, 98 R; 110/223; 376/311, 261, 451, 272; 83/923, 19, 23

[56] References Cited

U.S. PATENT DOCUMENTS

| | | | |
|---|---|---|---|
| 3,815,323 | 6/1974 | Longo | 100/229 A |
| 3,838,551 | 10/1974 | Arikawa et al. | 100/229 A |
| 4,008,658 | 2/1977 | Stock et al. | 252/626 |
| 4,044,914 | 8/1977 | Hopkins et al. | 100/229 A |

FOREIGN PATENT DOCUMENTS

| | | | |
|---|---|---|---|
| 2730723 | 2/1978 | Fed. Rep. of Germany | 252/628 |
| 2659691 | 11/1978 | Fed. Rep. of Germany | 252/626 |
| 3213544 | 10/1983 | Fed. Rep. of Germany | 252/626 |
| 3213497 | 10/1983 | Fed. Rep. of Germany | 252/626 |
| 2000959 | 1/1982 | Japan | 252/626 |
| 1215265 | 12/1970 | United Kingdom | 252/626 |

Primary Examiner—Stephen J. Lechert, Jr.
Assistant Examiner—Howard J. Locker

[57] ABSTRACT

Machine for compacting fuel assemblies, constituted by protective structures containing the fuel and carrying caps at their ends, and for separating the caps from said structures, wherein it comprises a frame forming a lateral bearing surface, a compacting slide block forming a lateral bearing surface facing the first-mentioned bearing surface, a feed opening formed in the frame for introducing an assembly between these surfaces, means for displacing the slide block in a direction perpendicular to these surfaces, two cutting members carried by the slide block and respectively facing the two discharge openings for the caps formed in the frame at the ends of the bearing surface formed thereon, means for displacing the cutting members in said direction in order to separate the caps from the structures, and means for discharging the compacted structure to a discharge opening for the same, formed in the frame.

4 Claims, 2 Drawing Figures

MACHINE FOR COMPACTING FUEL ASSEMBLIES

BACKGROUND OF THE INVENTION

The present invention relates to a machine for compacting fuel assemblies, constituted by protective structures containing the fuel and carrying caps at their ends, and for separating the caps from the structures.

During the shearing of dismantled fuel assemblies, it is often necessary to carry out the prior shaping and tightening of the protective structures of the fuel. In addition, the caps equipping in most cases fuel assemblies, in order to permit their handling or placing in reactors, must usually be separated from the protective structures before dissolving the fuel in nitric acid. At present, the assemblies are compacted and the caps separated by means of two different machines.

Thus, a first known procedure consists of separating the caps in a first machine involving a mechanical process, such as sawing, following with the compacting of the protective structures in a second machine, and finally the shearing of these structures into portions of limited length in a third machine, in order to permit the dissolving of the fuel in acid. This first procedure suffers from the disadvantage of being particularly onerous, because it requires three different machines for carrying out the three operations which have to be performed on the assemblies. This large number of machines increases the risk of failure of one of them, with the result of a productivity drop in the production line.

A second known procedure consists of compacting the fuel assemblies in a first machine, then shearing the protective structures and their separation from their caps in a second machine. Although this procedure only involves the use of two machines, it has a number of disadvantages. Firstly, it makes it necessary to equip the shears with complementary stations, such as a cap slide leading to an increase in the complexity of these machines. Moreover, the separation of the caps within the shears has the important disadvantage that the caps come into contact with the fissile material, so that they must be looked upon as $\alpha$ waste. This significantly increases the quantity of waste of this type which, as is known, involves very stringent handling and conditioning precautions.

Finally, no matter what the procedure used, the hitherto known compacting machines use a side clamping means, which locally deforms the components of the assembly. One of the risks resulting from this deformation is the fracture of the structures surrounding the fuel, due to excessive stretching of the deformed parts (exceeding the breaking load in tension).

BRIEF SUMMARY OF THE INVENTION

The present invention relates to a machine making it possible in a novel way to simultaneously compact the fuel assemblies and separate their caps, whilst not suffering from the disadvantages of the known procedures. Thus, the machine according to the invention brings about a tightening of the protective structures of the fuel and not a deformation thereof, whilst ensuring that the caps are removed outside and beyond the shears, so that they do not have to be considered as $\alpha$ waste.

The present invention therefore specifically relates to a machine for compacting fuel assemblies, constituted by protective structures containing the fuel and carrying caps at their ends, and for separating the caps from said structures, wherein it comprises a frame forming a lateral bearing surface, a compacting slide block forming a lateral bearing surface facing the first-mentioned bearing surface, a feed opening formed in the frame for introducing an assembly between these surfaces, means for displacing the slide block in a direction perpendicular to these surfaces, two cutting members carried by the slide block and respectively facing the two discharge openings for the caps formed in the frame at the ends of the bearing surface formed thereon, means for displacing the cutting members in said direction in order to separate the caps from the structures, and means for discharging the compacted structure to a discharge opening for the same, formed in the frame.

Preferably, the machine according to the invention is able to accept fuel assemblies of different lengths. Thus, the slide block then comprises a moving part, on which is formed a portion of the bearing surface of the slide block and means for displacing this moving part in a direction parallel to said surface, one of the cutting members and the means for displacing said member being mounted in the said moving part.

The slide blocks can then comprise an interchangeable part on which is formed another portion of the bearing surface of the slide block, said interchangeable part being chosen as a function of the position occupied by the moving part, in such a way that the slide block has a continuous bearing surface.

In a comparable manner, the frame can also comprise an interchangeable plug on which are formed a portion of the bearing surface of the frame and the discharge opening for the caps facing the cutting member mounted in the moving part of the slide block.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
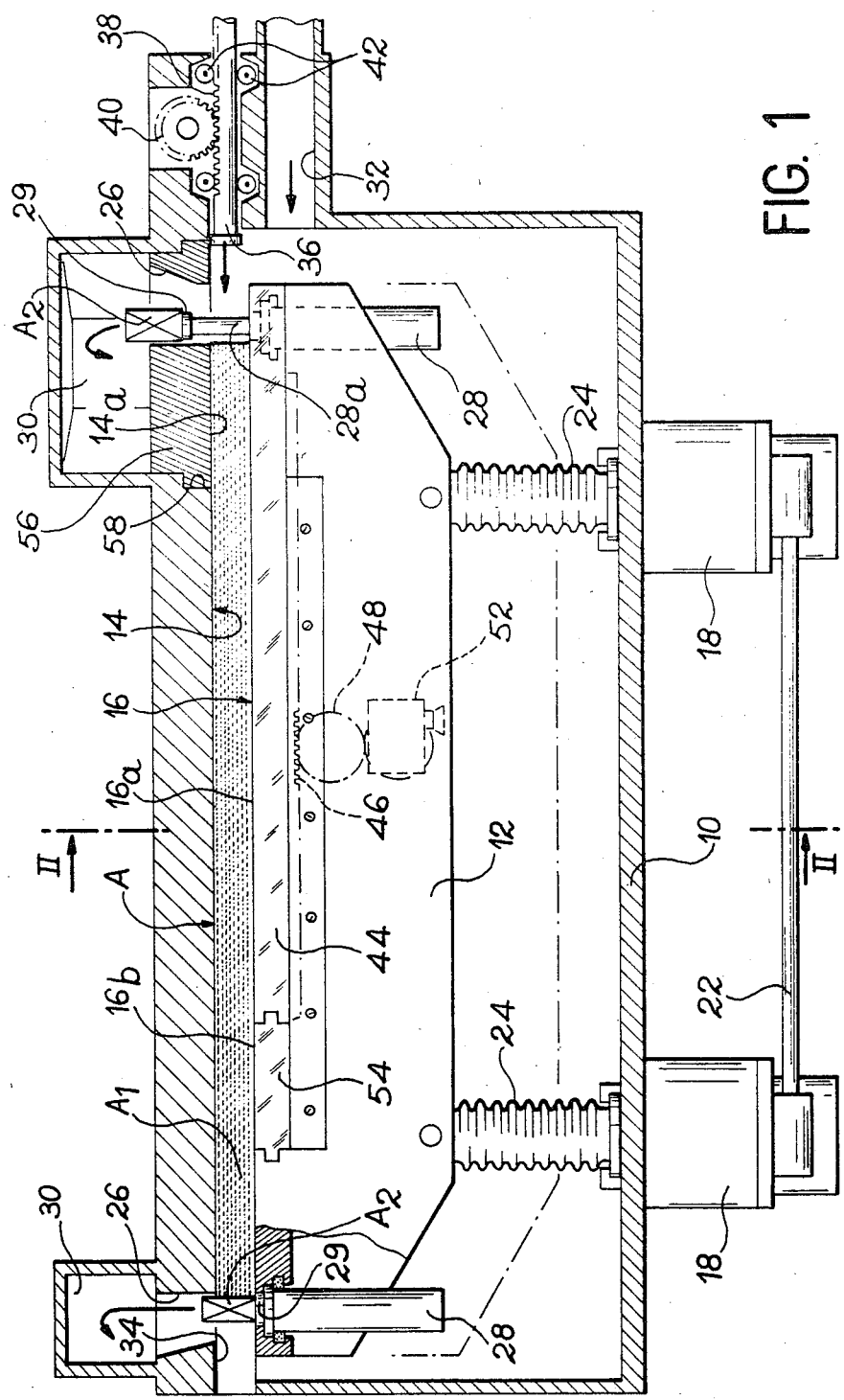
FIG. 1 a plan view in diagrammatic section of a machine according to the invention.

As can be gathered from the drawings, the machine according to the invention comprises a frame 10 in which is slidingly received a slide block 12. More specifically, frame 10 comprises a planar, vertical bearing surface 14 serving as a lateral support for a fuel assembly A, whose protective structure $A_1$ containing the nuclear fuel is to be compacted and from whose ends $A_2$ are to be removed the caps. Slide block 12 also has a planar bearing surface 16 parallel to surface 14 and which faces the latter, in such a way that assembly A can be introduced between these two surfaces by means to be described hereinafter. Each of the surfaces 14 and 16 then bears against the opposite lateral faces of assembly A.

Slide block 12 is mounted in mobile manner in frame 10, in a direction perpendicular to surfaces 14 and 16, i.e. in a horizontal direction. The displacement of the slide block is controlled, in the represented embodiment, by two electrical jacks 18 fixed to frame 10 and connected to slide block 12 by horizontal rods 20, perpendicular to surfaces 14 and 16. Obviously, the electrical jacks 18 could be replaced by any equivalent control means, such as hydraulic jacks, or a screw-nut control system. Preferably, the jacks 18 are synchronized by a synchronizing shaft 22. In addition, within frame 10, the control rods 20 are protected by sealing bellows 24 connecting the frame to the slide block.

As is more particularly shown in FIG. 1, the length of the bearing surface 14 formed on frame 10 is equal to or slightly less than the length of the protective structures $A_1$ of the fuel assembly. Beyond the ends of said surface 14, frame 10 has two openings 26 via which are discharged the caps $A_2$ after they have been detached from structures $A_1$.

Thus, it can be seen from FIG. 1 that the bearing surface 16 is extended until it faces openings 26 and at this level carries two hydraulic jacks 28, whose rods 28a are arranged perpendicularly to surfaces 14 and 16, facing openings 26 and so as to be able to project beyond surface 16 to within openings 26, when jacks 28 are actuated. The ends of the rods 28a of the jacks carry cutting members 29 making it possible to separate caps $A_2$ from the assembly, when the latter is positioned in the manner illustrated in FIG. 1. Obviously, jacks 28 can be replaced by any equivalent actuating means. In the same way, the cutting members can be constituted by any known member making it possible to separate caps $A_2$ from the structures $A_1$ of the fuel assembly.

Preferably, the openings formed in frame 10 issue into discharge systems for the caps $A_2$, which are constituted e.g. by hoppers 30 in the represented embodiment.

In the machine shown in the drawings, the assemblies A are introduced horizontally, in a direction parallel to surfaces 14 and 16, through a feed opening 32, which is displaced towards the rear of slide block 12 relative to the bearing surface 14 of the frame. To enable said assemblies to be introduced, it is therefore necessary that slide block 12 can move backwards sufficiently to free opening 32, as shown by the broken line in FIG. 1. At this time, the bearing surface 16 of the slide block is preferably aligned or slightly set back with respect to the edge of the openings 32 furthest from surface 14.

Assembly A is introduced through opening 32 preferably by means of a per se known ancillary device, which does not form part of the present machine. This device brings the assembly between surfaces 14 and 16, in such a way that caps $A_2$ face rods 28a of the jacks and the discharge openings 16. Jacks 18, synchronized by means of shaft 22, are then simultaneously put into operation to move slide block 12 towards bearing surface 14. During this operation, the force applied with the aid of jacks 18 is such that it ensures the compacting of protective structures $A_1$ of the fuel assembly without deforming the same. It should be noted that the cutting members 29 then occupy their set back position, shown in the left-hand part of FIG. 1, in which they are flush with surface 16 and ensure the continuity thereof. In view of the presence of openings 26 level with caps $A_2$, said compacting operation has the effect of advancing caps $A_2$ into openings 26, as can be seen in the left-hand part of FIG. 1.

During a second stage of using the machine according to the invention, jacks 28 are actuated, which has the effect of advancing the caps $A_2$ into openings 26 and of separating them from structures $A_1$, which then bear against surface 14. Caps $A_2$ are then discharged into each of the hoppers 30, as illustrated by the arrows in the drawings.

The moving back of rods 28a of the jacks is then controlled, in order to free the ends of the protective structures $A_1$ of the fuel assembly. After moving back slide blocks 12 by a few tenths of a mm in order to free structures $A_1$, it is then possible to discharge the latter horizontally through an opening 34 made in frame 10, on the side opposite to the feed opening 32. The edge of opening 34, opposite to the bearing surface 16, is substantially aligned with the bearing surface 14 of the frame.

In order to discharge structures $A_1$ through opening 34, on the side of opening 32 and in alignment with opening 34, there is also a push rod 36, which can be applied to the end of structures $A_1$ opposite to discharge opening 34. In the represented embodiment, push rod 36 is provided with a rack 38, with which meshes a pinion 40, whose rotation can be controlled by a not shown electric motor, or by any equivalent means. Push rod 36 is guided by rollers 42 mounted in frame 10.

In accordance with an improvement to the machine described hereinbefore, means are provided for adapting said machine to the processing of assemblies A of different lengths.

Thus, it can be seen in FIG. 1, that part 16a of the bearing surface 16 of the slide block is formed on a moving part 44 thereof and the latter carries jack 28, which is located in the right-hand part of the drawing. More specifically, said part 44 of the slide block can move horizontally with respect to the remainder thereof in the direction defined by bearing surface 16.

Figure 2:
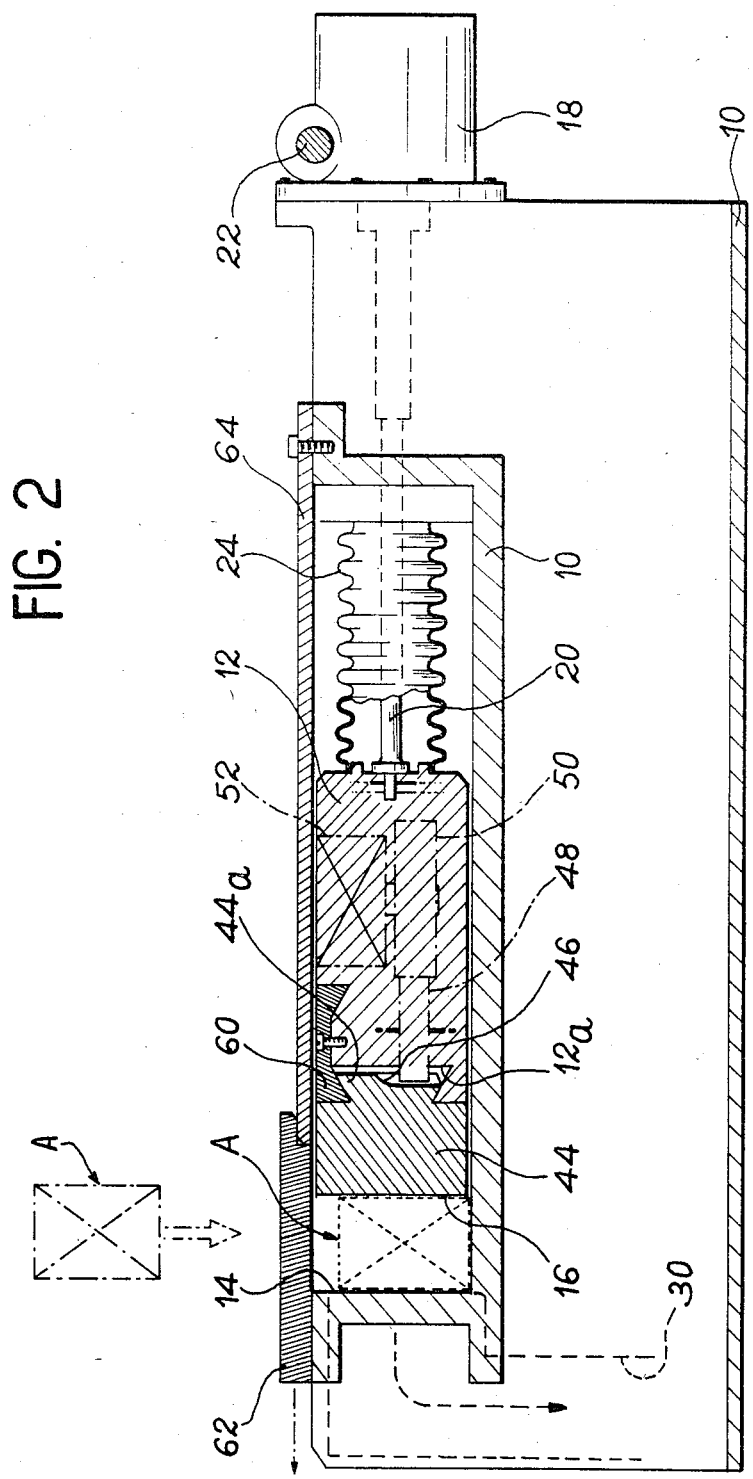
FIG. 2 a larger scale view in section along line II—II of FIG. 1.

To this end and as illustrated more specifically in FIG. 2, part 44 has a dovetail joint 44a, received in a dovetail groove 12a formed in slide block 12. Part 44 is moved by a rack 46, formed on dovetail joint 44a and in which meshes a pinion 48, whose vertical spindle is carried by slide block 12. Pinion 48 is itself driven by a vertically axed second pinion 50, whose rotation is controlled by a drive means 52, such as an electric geared motor or any equivalent device. As a result of this construction, it is easy to vary, at random, between two given values, the distance separating jacks 28 and consequently the length of the assemblies A to be treated.

It is obvious that the means described hereinbefore for varying the distance separating jacks 28 are not adequate when their operation moves part 16a away from the bearing surface of the slide block, which leads to a continuity in said bearing surface. Thus, the continuity of bearing surface 16 is ensured, by inserting between moving part 44 and the remainder of sliding block 12, an interchangeable part 54 on which is formed another part 16b of bearing surface 16. FIG. 1 shows that part 54 is closely linked on the one hand with sliding block 20 and on the other hand with moving part 44, e.g. by mortise and tenon joints and by the action of said part 44, which applies it to the slide block 12.

In a comparable manner, it is clear that the elongation of assembly A has the effect, on the side of jack 28 carried by moving part 44, of producing a gap in bearing surface 14 of the frame, if the length of said surface corresponds to that of the shorter assemblies. Thus, it can be seen in FIG. 1 that the opening 26 facing moving jack 28, i.e. on the right-hand part of FIG. 1, is formed in an interchangeable plug 56, whose dimensions are chosen as a function of the position of moving part 44. Plug 56 is mounted in an opening 58 formed in the frame and it comprises part 14a of bearing surface 14. The length of opening 58 is chosen in such a way as to permit the adaptation of the machine to the longer and shorter assemblies which it is required to treat.

In order to permit a replacement of part 44 of the slide block, it can be seen that part of the dovetail groove 12a formed in slide block 12 is produced in a detachable part 60.

Finally, it can be seen in FIG. 2 that the upper part of frame 10 is closed above the space defined between surfaces 14 and 16 and in which is received assembly A, by a cover 62 solidly fixed to the frame in order to ensure the looping of stresses. To permit an optional intervention between frame 10 and slide block 12, cover 62 is preferably detachable. Cover 62 is extended above the slide block by a plug 64, which completes the confinement of the machine.

According to a constructional variant of the invention diagrammatically shown in FIG. 2, the assembly feed opening 32 can be eliminated and then each assembly is introduced vertically, with cover 62 omitted.

Preferably, the machine according to the invention is coupled to shears, which are directly connected to the discharge opening 34 for structures $A_1$. Push rod 36 can then be used for the stepwise advance of the structures $A_1$ intothe shears, the push rod being retracted and the structures held in place by the slide block 12 at the time of cutting.

Obviously, the invention is not limited to the embodiment described in exemplified manner hereinbefore and in fact covers all variants thereof. Thus, the assemblies can be introduced into the machine in different ways. In a comparable manner, it has been seen that the different actuating means described can be replaced by any other known actuating means.

What is claimed is:

1. A machine for compacting fuel assemblies, constituted by protective structures containing the fuel and carrying caps at their ends, and for separating the caps from said structures, comprising a frame forming a lateral bearing surface, a compacting slide block forming a lateral bearing surface facing said first-mentioned bearing surface, a feed opening formed in the frame for introducing an assembly between said surfaces, means for displacing the slide block in a direction perpendicular to said surfaces, two cutting members carried by the slide block and respectively facing two discharge openings for said caps formed in said frame at the ends of the bearing surface formed thereon, means for displacing said cutting members in said direction in order to separate said caps from said structures, and means for discharging a compacted structure so produced through a discharge opening for said compacted structure formed in said frame.

2. A machine according to claim 1, wherein said slide block comprises a moving part, on which is formed a portion of the bearing surface of said slide block and means are provided for displacing said moving part in a direction parallel to said surface, one of the cutting members and said means for displacing said member being mounted in the said moving part.

3. A machine according to claim 2, wherein said slide block also comprises an interchangeable part on which is formed another portion of said bearing surface of said slide block, said interchangeable part being selected as a function of the position occupied by said moving part, in such a way that said slide block has a continuous bearing surface.

4. A machine according to claim 2, wherein said frame has an interchangeable plug, on which are formed part of said bearing surface of said frame and said discharge opening for said caps are positioned facing said cutting members mounted in the moving part of said slide block.

* * * * *